United States Patent [19]
O'Dowd

[11] Patent Number: 5,196,126
[45] Date of Patent: Mar. 23, 1993

[54] OSCILLATING CHEMICAL REACTION
[75] Inventor: Dennis H. O'Dowd, Toronto, Canada
[73] Assignee: Iomech Limited, Mississauga, Canada
[21] Appl. No.: 562,697
[22] Filed: Aug. 6, 1990
[51] Int. Cl.$^5$ ............................................. C02F 1/50
[52] U.S. Cl. .................................. 210/754; 210/764; 210/765; 422/37
[58] Field of Search .................... 210/753–756, 210/764, 765; 422/37; 252/180, 181

[56] References Cited

U.S. PATENT DOCUMENTS

| | | | |
|---|---|---|---|
| 2,443,429 | 6/1948 | Marks et al. | 210/754 |
| 3,136,716 | 6/1964 | Kitter | 210/753 |
| 3,189,518 | 6/1965 | Glasgow | 210/753 |
| 3,733,266 | 5/1973 | Bishop et al. | 210/754 |
| 3,975,271 | 8/1976 | Saunier et al. | 210/753 |
| 4,451,376 | 5/1984 | Sharp | 210/754 |
| 4,555,347 | 11/1985 | O'Dowd et al. | 210/764 |

FOREIGN PATENT DOCUMENTS

| | | |
|---|---|---|
| 1488708 | 6/1989 | U.S.S.R. |
| 2210362A | 6/1987 | United Kingdom |

OTHER PUBLICATIONS

Epstein et al., "Oscillating Chemical Reactions", *Scientific American*, Mar., 1983, pp. 112–123.
Walker, "The Amateur Scientist–Chemical Systems that oscillate between one color and another", *Scientific American*, Jul., 1978, pp. 120–130.

*Primary Examiner*—Thomas Wyse
*Attorney, Agent, or Firm*—Smart & Biggar

[57] ABSTRACT

A process of producing a disinfecting BZ reaction comprising continuously adding, at a point in a system of continuously flowing water in which a reductant consisting of microbial life forms is present, halogens or halogen containing compounds which hydrolize to create two bistable systems at equilibrium. The first bistable system consists of $Cl_2$, HOCl, OCl and chloramines in the water, and the second bistable system consists of $IO_3^-$, $I_2$ and HIO in the water. The bistable systems when perturbed by the reductant will initiate an oscillating reaction certain of whose intermediate products are microbicidal.

7 Claims, 1 Drawing Sheet

OSCILLATING CHEMICAL REACTION

FIELD OF INVENTION

This invention relates to the enhancement of biocidal efficacy of commonly used halogens in the disinfection of water, and to their use to disinfect solids in contact with these water such as the inner walls of pipes.

BACKGROUND OF THE INVENTION

Drinking, waste, or industrial water is currently treated with halogens whose oxidizing biocidal and disinfecting action is well known. With regard to drinking water, the most common disinfection treatment is with chlorine and by-products thereof.

Chlorine has a strong biocidal action and residual free chlorine is usually maintained in water supplied to consumers to ensure that harmful bacteria are destroyed before the water reaches its destination.

Unfortunately, during the complex reactions which occur between the chlorine and organisms and organic pollutants various chloramines and other noxious products are formed whose biocidal action is weaker than chlorine or not biocidal at all, and these tend to leave a disagreeable smell and taste in the water. In addition the production of chloramines and other chlorinated products results in the requirement that additional chlorine must be added to the water in order to maintain the desired residual free chlorine required to destroy bacteria.

Presently within the art there are a few methods which have proposed a combination of two disinfecting species wherein one is used as a chemical reagent (not a disinfectant) whose sole purpose is to regenerate biocidal forms of the second species from spent forms of the second species. Examples of these where the two halogens chlorine and iodine are used, are U.S. Pat. No. 2,443,429 issued June 15, 1948 in the name of H. C. Markes et al and U.S. Pat. No. 3,975,271 issued Aug. 17, 1976 in the name of B. Saumier. In the case of these two prior patents the halogen chlorine or its partially reacted forms such as HOCl and NHCl are introduced to oxidize iodide to biocidal iodine ($I_2$) which reacts with bacteria and is so reduced to $I^-$ at which time more chlorine is introduced to re-oxidize the iodide back to biocidal iodine in order to allow the process to be repeated.

In each of these systems the stated purpose of the invention is to lower the cost of biocidal iodine ($I_2$) by reoxidation and re-use: both cases use the biocidal properties of iodine, not of the oxidizer. However, these methods require levels of iodine to be present in the water well above those generally considered physiologically acceptable for continuous human consumption, as only these high levels of iodine are sufficiently biocidal for use as disinfectants. (Minimum levels of biocidal iodine normally deemed acceptable for water treatment purposes in Canada and the United States are 0.5 mg/l to 10 mg/l depending on the condition of the water and also the volume to be consumed daily by humans over a period of time).

Also it has been found that in systems using chlorine to regenerate or reoxidize iodine to biocidal forms, significant bacterial growth takes place that would not normally be found in this amount of chlorine or iodine used alone (see Favero et al, Survival of Pseudomonas in an Iodinated Swimming Pool Applied Microbiology, Vol. 14, p. 627, 1966).

The present invention overcomes these disadvantages by employing a BZ reaction in which a minor bistable iodine system at levels below those found physiologically unacceptable for human consumption is coupled with a major bistable chlorine system by the presence of microbial life or their metabolic by-products into an active disinfecting BZ reaction which enhances chlorine's biocidal ability.

In recent years the phenomenon of oscillating chemical reactions, more commonly known as BZ (for Belousov-Zhabotinsky) reactions, has been recognized. The BZ reaction has been recently described by Epstein et al in an article in the publication Scientific American, March 1983, p. 112, in which three basic conditions were laid out as requirement for designing a chemical oscillator. The first condition is that the chemical system must be far from equilibrium. The second condition is feedback; in other words some product of a step in the reaction sequence must exert an influence on its own rate of formation. The third condition is that the chemical system must exhibit bistability, meaning that under the same set of external conditions the system must be able to exist in two different stable steady states. These reactions to date have not found any type of useful application.

The present invention overcomes the aforesaid disadvantages in the prior art by maintaining a physiological acceptable concentration level of iodine to persons consuming the water who have an iodine deficiency, or who have adequate dietary iodine. The present invention also reduces the presence, in water treated with chlorine, of combined chlorines such as chloroform and chloramines which cause bad taste and an odour. Furthermore the present invention enhances the biocidal strength of chlorine by allowing low levels of chlorine to kill bacteria that would otherwise be immune.

When the organic content of water is particularly high at some point in the system, for example due to bacterial colonization on the inner walls of the pipe carrying the water, it may be impossible in present practice to disinfect the water so that it is suitable to drink. Chlorine at levels acceptable for potable water is not always capable of killing all forms of microbial life although it is generally capable of killing organisms of public health concern. Chlorine resistant organisms such as autochemotrophic or hetrotrophic organisms colonize on pipe walls and form organic slimes which remove chlorine from the system, rendering the amount of chlorine which is generally considered acceptable to introduce during treatment, insufficient to make the water supply contain residual free chlorine.

To meet this problem of the buildup of bacteria and their by-products on the inner walls of pipes, the present method of removing bacterial colonization debris is through the physical method of pigging and/or swabbing.

It is an object of the present invention to provide a BZ reaction using chlorine and iodine to disinfect the inner walls of pipe or to disinfect other solids using a continuously flowing fluid containing this BZ reaction.

SUMMARY OF THE INVENTION

In its broadcast aspect the invention consists of a process of producing a disinfecting BZ reaction comprising continuously adding, at a point in a system of continuously flowing water, in which a reductant consisting of microbial life forms or their metabolic by-products is present, halogens or halogen containing compounds which hydrolize to create two bistable systems at equilibrium. The first bistable system consists of $Cl_2$, HOCl, OCl and chloramines in the water, and the second bistable system consists of $IO^-_3$, $I_2$ and HIO in the water. The bistable systems when perturbed by the reductant will initiate an oscillating reaction certain of whose intermediate products are microbicidal.

DESCRIPTION OF THE DRAWINGS

Example embodiments of the invention are shown in the accompanying drawings in which.

DESCRIPTION OF THE INVENTION

Figure 1:
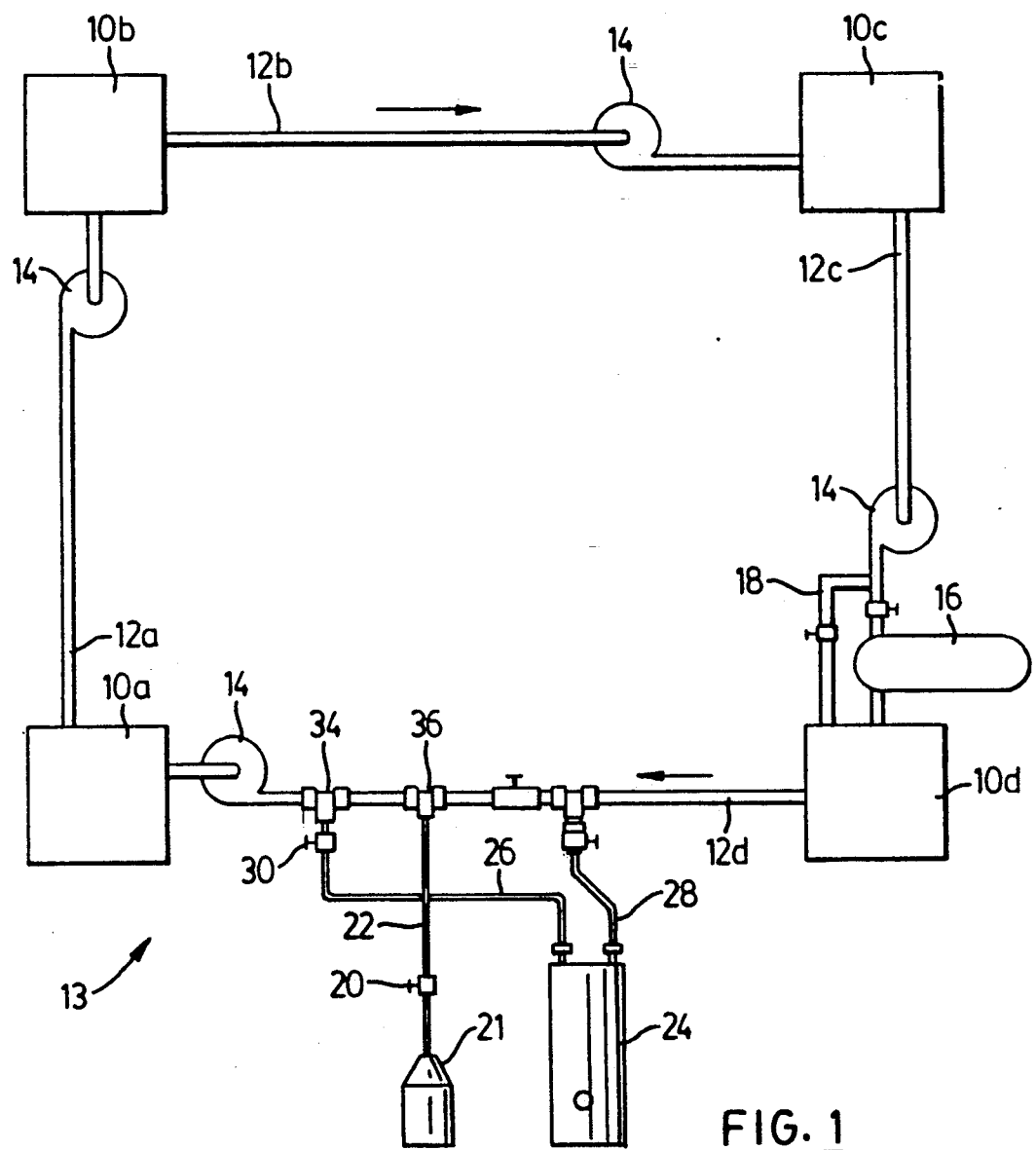
FIG. 1 is a schematic diagram showing apparatus to carry out experimental testing of the invention.

A preferred embodiment of the present invention consists of adding iodine or an iodine releasing compound to continuously flowing water containing a concentration range of chlorine of about 0.15–5.0 mg/l of water, the concentration range of iodine being about 0.025–0.15 mg/l of water. The addition of the iodine or iodine releasing compound should be done at a point in the continuously flowing water where the chlorine is 35%–65%, (the preferred being 50%) of unhydrolysized, unreacted $Cl_2$ and the remainder of the chlorine is reacted to form HOCl, OCl and, where nitrogenous matter is present, chloramines, the concentration of chloramines being less than 25% of the concentration of HOCl.

In some cases it may be necessary to pretreat the water by breakpoint chlorination whereby $Cl_2$ is added to oxidize the chloramines, or by other procedures to reduce the concentration of chloramines to the above specified amount.

The presence of HOCl, chloramines, and OCl will establish the first bistable system near the addition point of iodine or iodine releasing compound.

At or about the addition point of iodine or the iodine releasing compound, a portion of iodine will be overoxidized by the chlorine present in the system to produce iodate ($IO_3$), a portion will remain as $I_2$ and a portion will hydrolyse to hypoiodus acid (HIO). This establishes the second bistable system required for the oscillating reaction.

All of the chemical species are at very low concentration levels with chlorine being the major bistable system and iodine the minor bistable system. The two bistable systems are far from equilibrium but temporarily at steady state. The $Cl_2$ compounds are at biocidal levels whereas the iodine compounds are not at levels generally recognized as biocidal.

The reductant or perturbing force is the presence of organic material already in situ on the pipe wall or present in the flowing water. This reductant initiates the oscillating reaction by creating an hysteresis loop in the bistable chemical systems. This reaction increases the cidal efficiency of the chemicals and their intermediaries.

The range of chlorine concentration as stated in the preferred embodiment is based solely on government standards and industry practice in maintaining potable water. The chlorine concentration level is not proportional to the iodine concentration level. Chlorine concentrations higher than that specified can be used for non-potable water provided that $Cl_2$ concentration does not exceed 5.0 mg/l at the iodine addition point.

It is well known that bacteria in a water system can adhere to the inner wall of a pipe and produce a build-up of by-products, which allow these organisms to be extremely resistant to the disinfecting abilities of very high concentration levels of biocidal halogens. Colonies of the above-mentioned resistant bacteria and their by-products form on the inner walls of pipes and provide protective cover for additional bacteria to harbour. This build-up of bacteria and by-products are an engineering concern as they impede the flow of water, may damage the pipes, and are a public health concern as they provide sheltered harbourage for potentially pathenogenic additional bacteria in the system which can occasionally shed from the wall and contaminate potable water. It is known that concentration levels of chlorine as high as 20 mg/l of water or concentration levels of iodine as high as 5 mg/l of water have virtually no effect on this type of bacteria. The current method of controlling this bacterial build-up is through the physical means of pigging and swabbing of the lines. Such means are costly and inefficient compared to the use of the present invention for keeping piping systems free of bacterial build-up on inner pipe walls. The oscillating chemical reaction as described above allows iodine and chlorine molecules to slowly penetrate the protective overburden, exposing the organism. As the bacteria are exposed they are killed by chlorination. The dead organism no longer adheres to the inner wall of the pipe and the organism and its protective overburden are then swept down stream by the current.

Separately, high levels of iodine or high levels of chlorine acceptable for water treatment, are unable effectively to penetrate the protective overburden of the organism because of the high probability of reaction at the surface. In accordance with this invention as the halogen molecules in their proportional relationship come into contact with bacteria or the protective overburden of the bacteria, the molecules begin to accumulate on the surface and in the marginal interior of this matter. This bioaccumulation allows the BZ reaction to take place within the matter, allowing penetration of the halogens deeper into the overburden to contact the active organisms whereby the chlorine compounds are able to kill them.

The iodine can be introduced into the system in a saturated solution by an iodine dispensing system such as that disclosed in U.S. Pat. No. 4,555,347 issued Nov. 26, 1985 to Iomech Limited assignee of Dennis O'Dowd and John Barry. Alternatively, the iodine can be introduced into the system as thermodynamically free iodine in the manner disclosed in my co-pending U.S. Patent Application Ser. No. 296,371 filed Jan. 10, 1989.

The preferred method of introducing chlorine into the system is in a form resulting in the production or by the introduction of $Cl_2$.

Experimental testing of the invention was carried out using apparatus shown schematically in FIG. 1 of the drawings.

Experimentation was conducted using pipe sections extracted from a working distribution system where bacterial colonization debris had accumulated on the inner wall of the pipes. The pipe sections were capped and filled with the water found in them at situ. The capped pipe sections were then transported to the laboratory where the apparatus shown in FIG. 1 was constructed. Two identical apparatus were constructed and experimentation was conducted using one as a control and one as a test. In the apparatus of FIG. 1 four 20 imperial gallon tanks 10 were connected with pipes 12 (the pipe sections mentioned above) to form a test system 13 simulating a water distribution system. Centrifugal pumps 14 located one in each section 12a, 12b, 12c and 12d of pipe 12 and were used to pump the water (clockwise as seen in the drawing) through distribution system 13. Connected to system 13, in one section 12c pipe 12, was an activated carbon and string polisher/filter 16 which allowed for dehalogenation of the water after a specified number of cycles. A bypass 18 around filter 16 was opened when dehalogenation by filter 16 was not wanted. A valve 20 controlled the release of chlorine from a chlorine bottle 21 through a line 22 to section 12d of pipe 12 and into the flow of water that was being pumped through the system. An iodine dispenser 24 of the type shown in U.S. Pat. No. 4,555,347 mentioned above was connected by a pair of lines 26,28 to section 12d of pipe 12 and control valves 30,32, one in each of lines 26,28 regulated the release of iodine from dispenser 24. The iodine was injected through line 30 at a tee 34 and the chlorine was injected at a tee 36 upstream from tee 34.

The control system (not shown, but identical to, FIG. 1 except for the presence of iodine dispenser 24) was chlorinated with 5 mg/l of chlorine to duplicate conditions in the working distribution system from which it was removed. Bypass 18 remained open so that dechlorination by the active carbon filter did not take place. In the test system iodine was also added at a concentration level of 2 mg/l of water to simulate the conditions of U.S. Pat. No. 2,443,429 mentioned above.

Both the control system and test system 13 were allowed to run for 12 hours and at the end of 12 hours both systems were shut down for testing the water in tanks 10. In the control tank the chlorine residual was found to be 0.05 mg/l of water. In the test tank the chlorine residual was less than 0.05 mg/l of water and the iodine concentration was less than 0.1 mg/l of water. Bacteria identified as coliforms were found in the following amounts:

|         | Test            | Control         |
|---------|-----------------|-----------------|
| Tank 10a | >10 coli/100 ml | 20 coli/100 ml  |
| Tank 10b | 9 coli/100 ml   | >10 coli/100 ml |
| Tank 10c | >10 coli/100 ml | 9 coli/100 ml   |
| Tank 10d | >10 coli/100 ml | >10 coli/100 ml |

The results of the experiment show that bacteria levels were not reduced by the introduction of $I_2$ at concentration levels of 2 mg/l of water contrary to the results stated in U.S. Pat. No. 2,443,429.

Both the control system and the test system were dehalogenated by being driven through activated carbon filter 16 for 10 passes in preparation for the next experiment, in which a chlorine concentration of 5 mg/l of water was again added to the control system and bypass 18 remained open. Test system 13 was also chlorinated to a concentration level of 5 mg/l of water but iodine was also added to the system at a concentration level less than 0.1 mg/l of water. Over the next two hours, test system 13 began to shed particular matter from the inner walls of the sections of pipe 12. The control system, on the other hand, continued to operate normally.

Test system 13 was shut down and the inner walls of pipe 12 were examined. First section 12a of pipe 12 in the test system had essentially all of the bacterial colonization on the inner wall of the pipe removed. Second section 12b of pipe 12 in the system had its biofilm reduced by approximately ½ at the inlet end of the pipe section and 1/10 at the outlet end of the pipe section. The third and fourth pipe sections 12c and 12d appeared unaffected.

Both the control system and test system 13 were dehalogenated by active carbon filter 16 and particulate matter was removed from the test system by placing course spun glass mats in tank 10c of the test apparatus.

A final experiment was conducted in which a chlorine concentration of 5 mg/l of water was added to the control system and to test system 13. A concentration level of $I_2$ was introduced to test system 13 at around $0.15 \pm 0.05$ mg/l of water and concentration readings of $I_2$ were taken at points around the test system. It was found that particulate matter began to shed from the inner walls of the sections of pipe 12 when traces of $I_2$ (measurable only at levels of 0.025 or greater) were present and the particulate matter stopped shedding from the inner walls of the pipe sections once the concentration level of $I_2$ reached 0.15 mg/l of water. From this it was determined that the maximum concentration range of $I_2$ allowed to initiate the BZ reaction was 0.15 mg/l of water. Both systems were then disassembled and on examination it was found that the inner walls of the sections of pipe 12 of the test system were cleaned of all organic matter and no organic or inorganic debris was found adhering to the inner walls. An examination of the control system showed that it had essentially the same amount of organic and inorganic debris adhering to the inner walls of the pipe sections as when the piping was removed from the working distribution system.

I claim:

1. A process of producing a disinfecting BZ reaction comprising continuously adding at a point in a system of continuously flowing water in which a reductant consisting of microbial life forms or their metabolic by-products is present, chlorine ($Cl_2$) or a $Cl_2$ releasing compound and iodine ($I_2$) or a $I_2$ releasing compound, the amount of $I_2$ present being in the range of about 0.025–0.15 mg/l of water, the $I_2$ being added before about 50% of the $Cl_2$ has been hydrolized, the amount of $Cl_2$ not exceeding 5.0 mg/l at the $I_2$ addition point, which hydrolize to create two bistable systems at equilibrium, the first bistable system consisting of $Cl_2$, HOCl, OCl and chloramines in the water, the total chloramine existing in the water or produced by reaction with microbial life or their metabolic by-products being present to an amount being less than 25% of the total HOCl, the second bistable system consisting of $IO_3$, $I_2$ and HIO in the water, which bistable systems when perturbed by the reductant will initiate an oscillating reaction certain of whose intermediate products are microbicidal.

2. A process as claimed in claim 1 in which the concentration of $Cl_2$ in the water is in a range whereby the water is potable.

3. A method as claimed in claim 1 in which the $I_2$ or $I_2$ releasing compound and $Cl_2$ or $Cl_2$ releasing compound are added to water flowing through a pipe whereby the disinfecting BZ reaction removes bacterial colonization debris from the inner wall of the pipe.

4. A process as claimed in claim 1 in which the $I_2$ is introduced in to the continuous flow system in a saturated solution.

5. A process as claimed in claim 1 in which the $I_2$ is introduced into the continuous flow system as thermodynamically free $I_2$.

6. A process as claimed in claim 1 in which the amount of chloramines is reduced to the maximum permissible level of 25% of the total HOCl by breakpoint chlorination wherein $Cl_2$ is added to the system to oxidize the chloramines.

7. A process as claimed in claim 1 in which the amount of chloramines is reduced to a maximum permissible level of 25% of the total HOCl prior to entry of the $I_2$ at the addition point.

* * * * *